United States Patent
Phillips et al.

(10) Patent No.: US 7,698,217 B1
(45) Date of Patent: Apr. 13, 2010

(54) MASKING PRIVATE BILLING DATA BY ASSIGNING OTHER BILLING DATA TO USE IN COMMERCE WITH BUSINESSES

(76) Inventors: Christopher Phillips, 22612 NE. 142 Pl., Woodinville, WA (US) 98072; Eric Engstrom, 12415 Holmes Pt Dr. NE., Kirkland, WA (US) 98033

( * ) Notice: Subject to any disclaimer, the term of this patent is extended or adjusted under 35 U.S.C. 154(b) by 0 days.

(21) Appl. No.: 09/553,068

(22) Filed: Apr. 20, 2000

(51) Int. Cl.
*G06Q 40/00* (2006.01)
(52) U.S. Cl. .............. 705/40; 705/44; 705/38
(58) Field of Classification Search .......... 705/39, 705/40, 44, 38
See application file for complete search history.

(56) References Cited

U.S. PATENT DOCUMENTS

| | | | |
|---|---|---|---|
| 5,883,810 A | | 3/1999 | Franklin et al. |
| 6,456,984 B1 * | | 9/2002 | Demoff et al. ............... 705/40 |
| 6,636,833 B1 * | | 10/2003 | Flitcroft et al. ............... 705/1 |
| 2001/0044787 A1 * | | 11/2001 | Shwartz et al. ............... 705/78 |
| 2002/0120587 A1 * | | 8/2002 | D'Agostino ............... 705/78 |
| 2003/0028481 A1 * | | 2/2003 | Flitcroft et al. ............... 705/39 |
| 2004/0158532 A1 * | | 8/2004 | Breck et al. ............... 705/74 |

FOREIGN PATENT DOCUMENTS

| | | |
|---|---|---|
| WO | WO 99 13421 A | 3/1999 |
| WO | WO 99/13421 A2 | 3/1999 |
| WO | WO 99 49424 A | 9/1999 |
| WO | WO 99/49424 A1 | 9/1999 |
| WO | WO 00 65517 A | 11/2000 |
| WO | WO 00/65517 A1 | 11/2000 |

OTHER PUBLICATIONS

PR Newswire article Citibank and First City Bancorporation of Texas in Merchant Credit Card Processing Agreement, Jul. 19, 1990.*

* cited by examiner

*Primary Examiner*—Jagdish N Patel
(74) *Attorney, Agent, or Firm*—Schwabe, Williamson & Wyatt, P.C.

(57) ABSTRACT

A method and apparatus for shielding a user's private billing data, such as credit card information, or other billing arrangements, but distributing different billing data to businesses during commerce therewith. Also disclosed is assigning the different billing data through real-time and advance distribution of the different billing data to a user, as well. Also disclosed is validating the correctness of a charge through confirmation of the charge with a financial institution, such as a bank, and by comparing itemized charges against expected charges identified by the user.

44 Claims, 5 Drawing Sheets

US 7,698,217 B1

MASKING PRIVATE BILLING DATA BY ASSIGNING OTHER BILLING DATA TO USE IN COMMERCE WITH BUSINESSES

BACKGROUND OF THE INVENTION

1. Field of the Invention

The present invention relates to the field of information systems. More specifically, the present invention relates to electronic purchases while maintaining privacy of customer billing data.

2. Background Information

The Internet is a well-known collection of public and private data communication and multimedia networks that operate using common protocols to form a world wide network of networks. Recently there has been an explosion in the availability of "virtual storefronts," e.g., commerce sites, reachable over the Internet. This rapid growth is due, in part, to the availability of fast, reliable and affordable computing device systems, and the general simplification of networking hardware and configuration. Thus, consumers and businesses alike now have access to hardware that makes effective online commerce commercially practicable.

To conduct online transactions, a business typically sets up a home page (e.g., "web site") on the World Wide Web, which is a logical overlay of the Internet. Web sites are simply machines located someplace within the Internet, with traditional naming conventions for the machines, e.g., named WWW, and holding themselves available to interact using standard protocols such as Hypertext Transfer Protocol (HTTP), and programming languages or environments such as Hypertext Transfer Protocol HTML, XML, Java, JavaScript, Java Beans, ActiveX, Visual Basic, or the like.

To make a purchase via a web site, a customer executes a "browser," such as the Internet Explorer, Netscape Navigator, or other network aware application program that is configured to communicate with a business' web site. The customer locates a particular product, and proceeds to a "check out" web page (or equivalent) to process a purchase transaction. At this point, the customer must enter credit card data and other data sufficient to identify the customer and allow purchase of goods to occur.

Historically, thieves have attempted to monitor such online transactions so as to steal consumer data to allow engaging in subsequent fraudulent transactions. Such monitoring is possible due to the inherently insecure nature of the Internet communication protocol. Internet communication follows the Transmission Control Protocol/Internet Protocol (TCP/IP), where data is broken into small packets that are individually sent to a recipient, received by the recipient and then re-assembled into the original data.

Unfortunately, anyone with access to a network has the ability to "snoop" network traffic on that network. Thus, anyone capable of monitoring some portion of the communication path between the customer and business is then able to monitor the purchase transaction. To overcome this security problem, various protocols, e.g., IP Security (IPSEC), Secure Sockets Layer (SSL), Secure HTTP (S-HTTP) have emerged to allow a business and a customer to securely communicate.

Although the data packets can still be snooped, their contents are now encrypted and unusable. Thus, thieves have recently begun to attack, or "hack," the online commerce sites so as to steal consumer data stored within databases maintained by the business. Since private consumer data, such as credit card information, once received by a business, is reassembled and decrypted by the business, the data is available for theft.

Thus, what is needed is an environment which provides consumers with the ability to engage in online transactions in a more secure manner.

SUMMARY

Apparatuses and methods registering a user with multiple businesses, where each business is given billing data, such as credit card data, that is unique to that business. Apparatuses, such as computing devices, and consumer electronic devices such as a telephone, communicate with a billing service so that billing data can be generated for particular businesses and used in commercial transactions with the business. Such communication and generation may be in advance of a purchase, or generated in real-time during a purchase.

DETAILED DESCRIPTION

In various embodiments of the invention, a customer is able to establish accounts with web sites without revealing private billing information such as credit card numbers, advance debit arrangements, invoice arrangements, etc. to a web site/business from whom the customer purchases goods.

Figure 1:
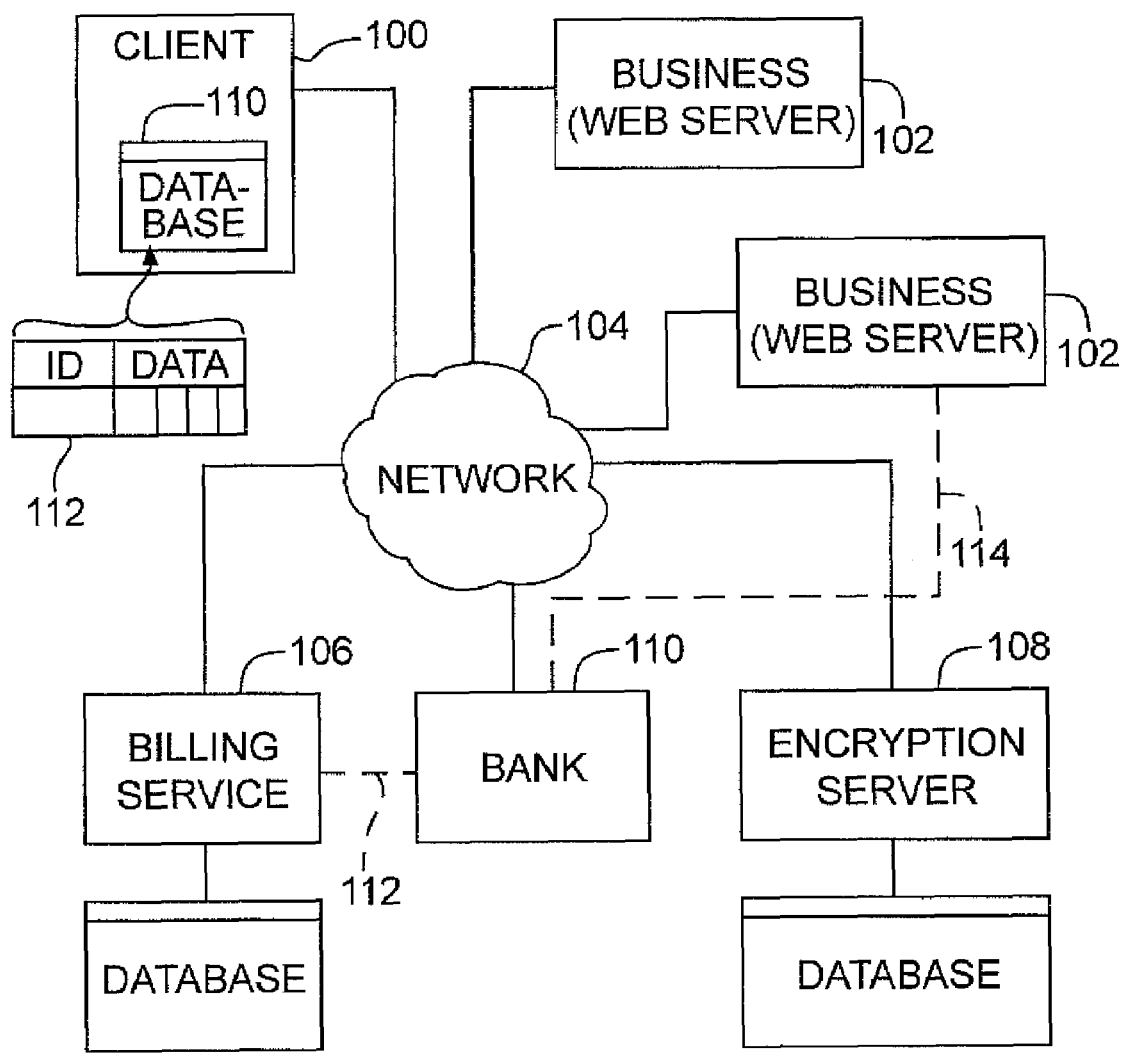
FIG. 1 illustrates a client in communication with a network.

FIG. 1 illustrates a client 100 in communication with a network 104. Also attached to the network are multiple servers 102 (business web sites), such as those provided by e-commerce sites, online retailers, or other businesses seeking to engage in commerce with by way of networked customers.

It is assumed the client comprises a computing device, such as a personal computer, which operates on behalf of a user (the purchaser of the good). In alternate embodiments, the client may be incorporated into an electronic card, a telephone (FIG. 6), a personal digital assistant (PDA), a portable audio device, a portable audiovisual device, a cellular telephone, a key-chain dongle, or within an automobile or other transportation device.

It is further assumed that each of the network locations to which a client may communicate provide a "web site" for engaging in commercial transactions, and will collectively be referred to as "businesses." For the purposes of this description, the phrase "web site" is intended to be a general reference to a network "presence" maintained by a business as well a logical presence maintained on behalf of a business.

The clients 100 and businesses 102 are in communication, through the network 104, with a billing service 106. The billing service is configured to allow clients 100 to reduce the risk of disclosing billing data, such as personal credit card numbers, debit card numbers, bank account numbers, and the like, to businesses 102. In one embodiment, the billing service facilitates commercial transactions by generating substitute billing data that the client 100 can use when engaging in commercial transactions with businesses 102. The phrase "substitute billing data" refers to valid billing data that is owned and/or controlled by the billing service 106, where billing data is temporarily or permanently distributed to clients 100 to replace personal and/or private billing data of the client.

Also in communication with the client 100 and businesses 102 by way of the network 104, is an encryption server 108. The encryption server can be used to provide encryption keys to a client 100 and business 102 to allow them to engage in secure communications. In one embodiment, the encryption server 108 is used to engage in conventional public key encryption systems, where the encryption server provides directory assistance services, allowing clients 100 and businesses 102 to retrieve public encryption keys.

In one embodiment, public key encryption services are used in addition to encryption services already available to a client (e.g., such as those available within a web browser or other communication program used by the client 100). In an alternate embodiment, already available encryption services, such as those provided by a web browser, are used to securely communicate with the encryption server 108 to obtain encryption keys for opening a secure communication channel between the client 100 and business 102.

This allows weaker security afforded by the client communication environment, e.g., a 40 bit or other short key system, to be used to communicate with the encryption server 108 to obtain more secure (e.g., longer) encryption keys. In this alternate embodiment, the built in security can also be used to transfer non-public key based cryptosystem keys, such as single use session keys, to the client 100 and business 102 for engaging in commerce.

Associated with clients 100 are local storage, such as a database 110, that can store billing data and encryption data for use during transactions with a business 102. In one embodiment, records 112 within the database 110 are keyed on a business 102 identity reference. A business identity can be tracked by way of business name, unique identifier for the business (e.g., a tax ID or other assigned/selected identifier), uniform resource locator (URL), TCP/IP "dot quad" network address (e.g., 10.1.2.3) used to access the business 102 over the network 104, or a combination of these and/or other references.

As illustrated, the client local storage containing the database 110 is integral to a client 100, such as within local mass storage device(s). However, it will be appreciated that the database may be contained within a separate computing device (not shown) associated with the client 100, or maintained by or in conjunction with the billing service 106 or encryption server 108. For example, the billing service 106 or encryption server 108 may be used to store backup copies of billing data.

Figure 2:
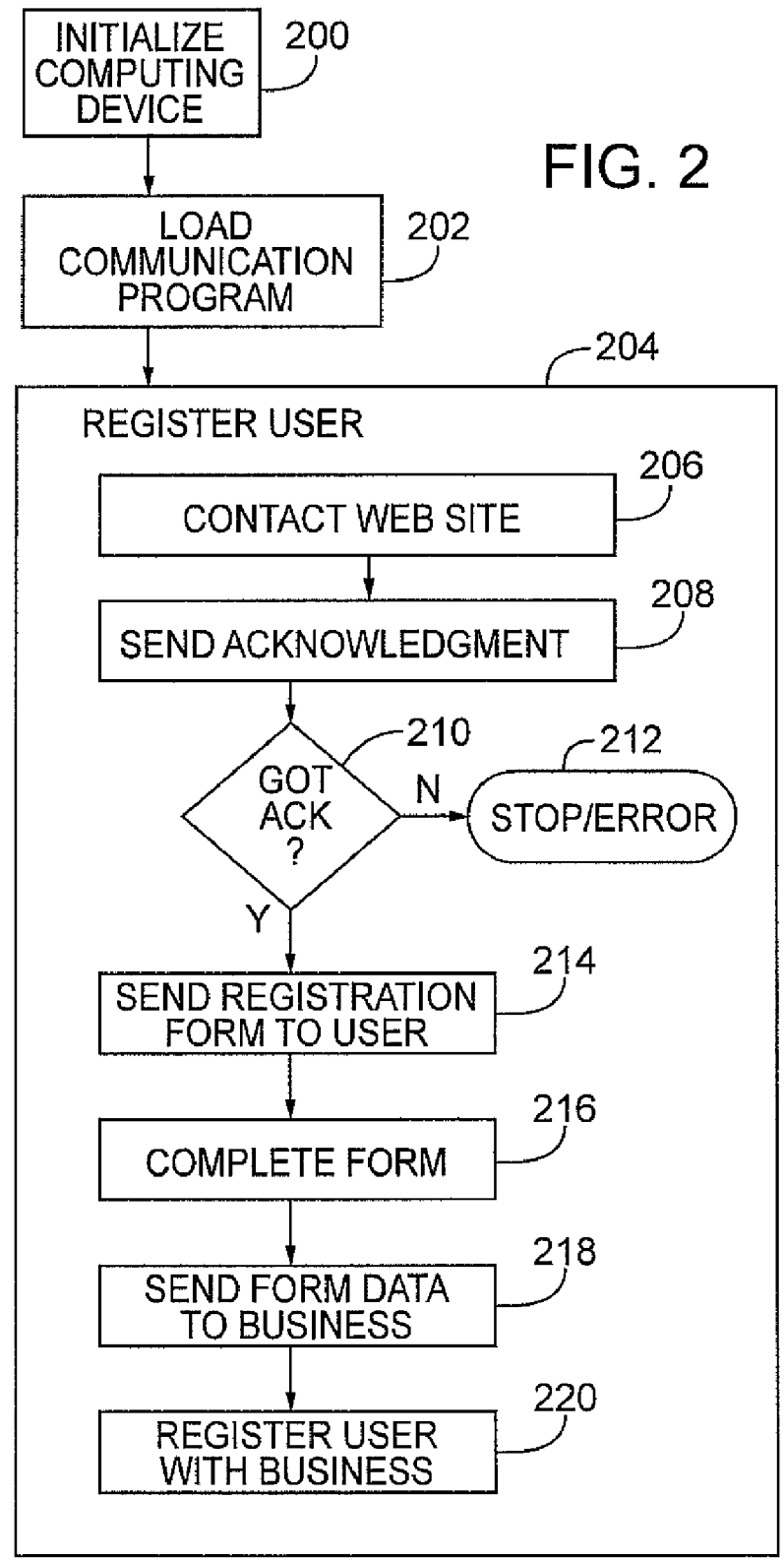
FIG. 2 is a flow chart according to one embodiment of the invention, illustrating a client registering with a business for purchasing a good.

FIG. 2 is a flow chart according to one embodiment of the invention, illustrating a client 100 registering with a business 102 for purchasing a good (e.g., a physical or electronic item) from the business.

The first illustrated operation is the user initializing 200 the computing device. It is assumed that initialization includes all steps required to boot, wake from an idle state, or otherwise start the computing device and configure it for purchasing activity. Assume that the computing device is a handheld ("palmtop") personal computer executing the Microsoft Windows operating system. After initialization, the user loads 202 a communication program through which to engage in the purchasing activity.

It will be appreciated that a number of environments may be used to implement the communication program. For example, a dedicated/custom application program may be designed to access businesses over a network. Alternatively, the communication program can be built using communication features provided by Internet web browser products, such as Microsoft Internet Explorer, Netscape Navigator, or Opera.

In this latter environment, the communication program may be implemented in one of, or a combination of, Java, JavaScript, JavaBeans, ActiveX, Visual Basic, HTML, DHTML, or other Internet related programming environments. It is assumed herein the communication program is based on an Internet browser, and that traditional Internet related communication protocols (e.g., TCP/IP, HTML, etc.) are used to communicate with businesses over the Internet. As discussed with respect to FIG. 1, each business provides a web address to which a client can connect to engage in purchase transactions.

After communication program initialization, the computing device is used to register 204 the user with a first web site maintained by a first business. Note, however, that even though the illustrated embodiment requires registration, it will be appreciated that in other embodiments, such registration need not occur first, or at all. To register, the computing device contacts 206 the first web site. In response the web site sends an acknowledgement 208. Since an Internet browser is assumed in use, the contact is by way of directing the browser to an appropriate receiving port monitored by a web server of the first business. It is assumed that port 80, the traditional Internet communication port, is used for communication. In the web browser context, acknowledgement can be determined by receiving a "home page" or start page from the first business' web server.

If 210 no acknowledgement is received, then a registration error has occurred and processing of this registration halts 212; in one embodiment, processing continues on (not shown) with registration attempts with other businesses. If acknowledgement is received, then the client 100 tells the business 102 it is interested in registering with the business 102.

In one embodiment, the registration process is automated, where the business web server is configured to receive a registration command from the client, and in response the business web server sends the client registration forms to complete. For example, in response to the registration command, an HTML form (or equivalent structure) containing fields for the user's name, address, telephone number, and billing data, such as credit or debit card numbers, invoicing preferences, etc., is sent 214 to the client. This form (or equivalent structure) is completed 216 and returned 218 to the business. In response, the business 102 processes the returned data and registers 220 the client with the billing data returned 218 to the business web server.

Completion of the form can be automated, through automated parsing of the form to identify various fields to fill out. In one embodiment, the extensible markup language (XML) is used to encode forms with semantic meaning to facilitate automatic interpreting and completing of a form. In an alternate embodiment, the user is allowed to review and complete a form with data known to the user, or the user can be provided with an opportunity to review and change a form completed by the computing device. In another embodiment, a special communication port, analogous to browser port 80, is used to send and receive registration data.

It will be appreciated that even though the above description assumes registration of a user with businesses, such registration is not required in order to obtain billing data to present to such businesses.

Figure 3:
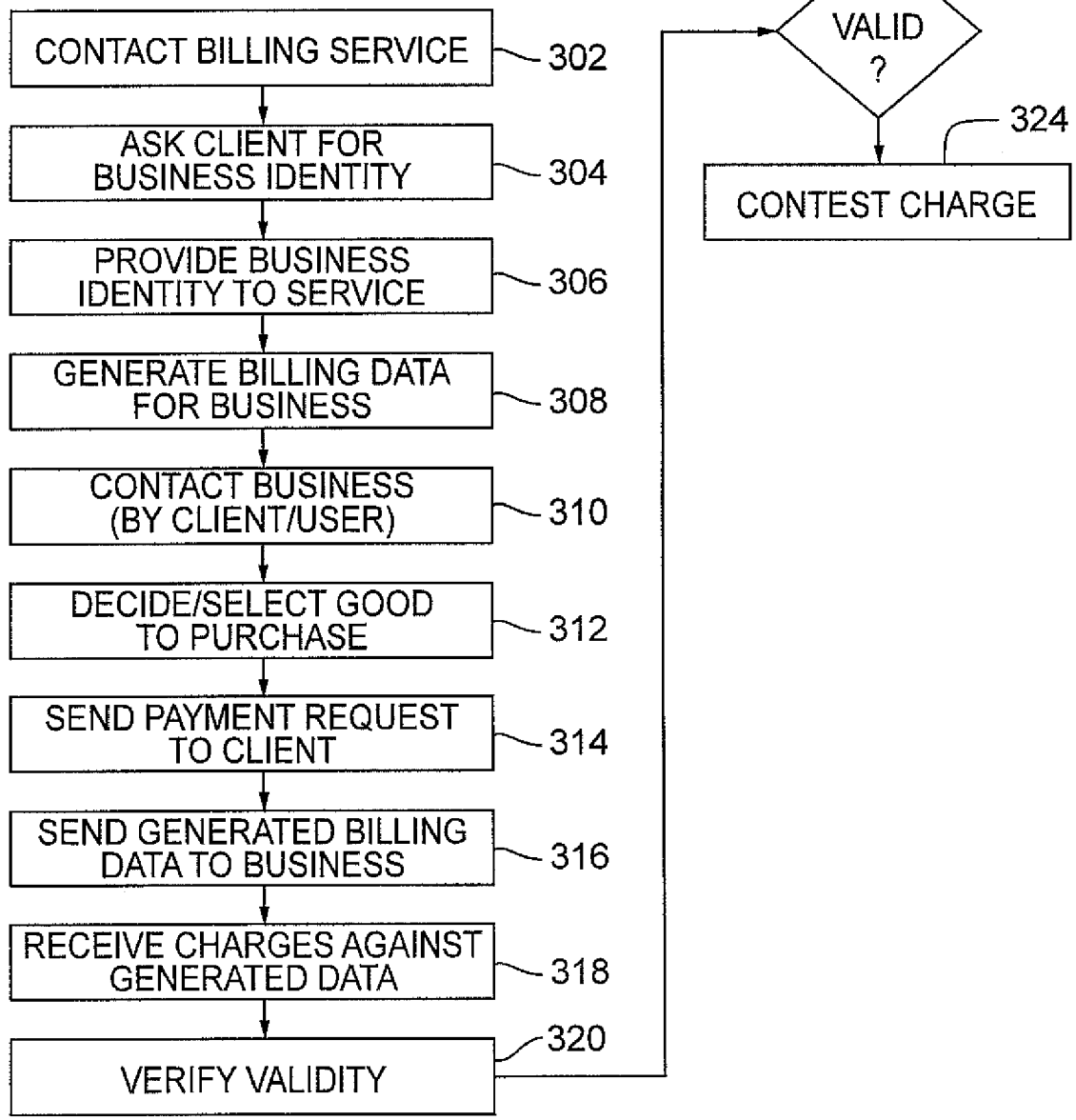
FIG. 3 is a flowchart according to one embodiment of the invention, in which a client purchases a good using billing data provided in advance by a billing service.

FIG. 3 is a flowchart according to one embodiment of the invention, in which a client 100 purchases a good using billing data provided in advance by a billing service 106. This figure concerns the logical data flow for obtaining billing data used by a client 100 in purchasing a good from a business 102.

As discussed above, there are intrinsic security issues within networks, such as the Internet or home/office local area networks (LANs), when more than just the parties to a conversation may "snoop" data passing on the network so as to discover secrets (e.g., credit card data or other sensitive data) disclosed during the conversation. In addition to attempts to securely encrypt the data transfers themselves, as will be discussed below, client provided billing data can be customized so as to reduce risk of theft and/or fraudulent use.

A first operation is to contact 302 the billing service. In response, the billing service asks 304 for the business 102 with which the customer seeks to interact. As discussed above, a variety of different information can be provided to identify the business. For simplicity, it is assumed that the business name is used to identify the business 102. The business name is provided 306 to the billing service 106. In response the billing service generates 308 billing data that can be used by the client in future transactions between the client and the identified business. The correspondence between billing data and business is tracked by the client 100 and/or it is tracked by the billing service 106.

Once the billing data is known, the client 100 can then contact 310 a business and decide 312 on a good to purchase. In response to a purchase decision, the business sends 314 a payment request to the client to arrange for receiving payment for the good. However, unbeknownst to the business 102, in response to the payment request, instead of sending personal credit card information, or other payment data, the client 100 instead sends 316 the business the billing data created in advance by the billing service for the business 102.

In one embodiment, the billing service obtains the billing data to distribute to clients by entering into agreements with banking institutions (or equivalent). The billing service is provided a large number different billing data, e.g., credit card numbers, debit card numbers, etc., and the billing service may also set up internal invoice accounts and the like. These different billing data are provided to a client 100 when the client registers with the billing service the client's intent to purchase from a business 102.

In one embodiment, billing data presented to a client 100 is uniquely associated with the particular business 102 the client 100 intends to purchase from. Charges made against the billing data are received 318 by the billing service in due course through standard financial institutions such as banks, savings and loans, investment houses, and the like. These charges are verified 320 for validity.

In one embodiment, the client informs the billing service of the items purchased (or possibly just item categories) so that the billing service may audit a particular charge to ensure only expected purchases appear on the charge. In one embodiment, the client informs the billing service of billing data that is provided to businesses so as to facilitate verification. For example, the origin of a charge can be compared against the business associated with the billing data.

In this embodiment, if 322 the charge origin fails to match the business expected to be making the charge, then the charge may be fraudulent. Consequently, the charge is contested 324 so as to allow the client to investigate the validity of the charge before being billed for the charge. However, if 322 the expected business matches the charge origin, then the client is billed for the purchase amount paid by the billing service. Note that the client may be billed in a manner entirely different from the payment system required/used by the business 102.

For example, the client may have arranged to have purchases automatically deducted from a bank account, while the billing service 106 is responsible for honoring a charge made by the business against credit card data provided by the client 100. Alternatively, the client may have arranged payment such that the billing service performs a direct wire transfer from a client's bank account directly into a receivables account of the business 102.

By associating a particular business with billing data, it is possible to account for a thief stealing apparently valid billing data from a business' Internet web server, and then attempting to engage in fraudulent activity. In addition to contesting 324 improper charges, the billing service can be configured to retire billing data that has been compromised.

Figure 4:
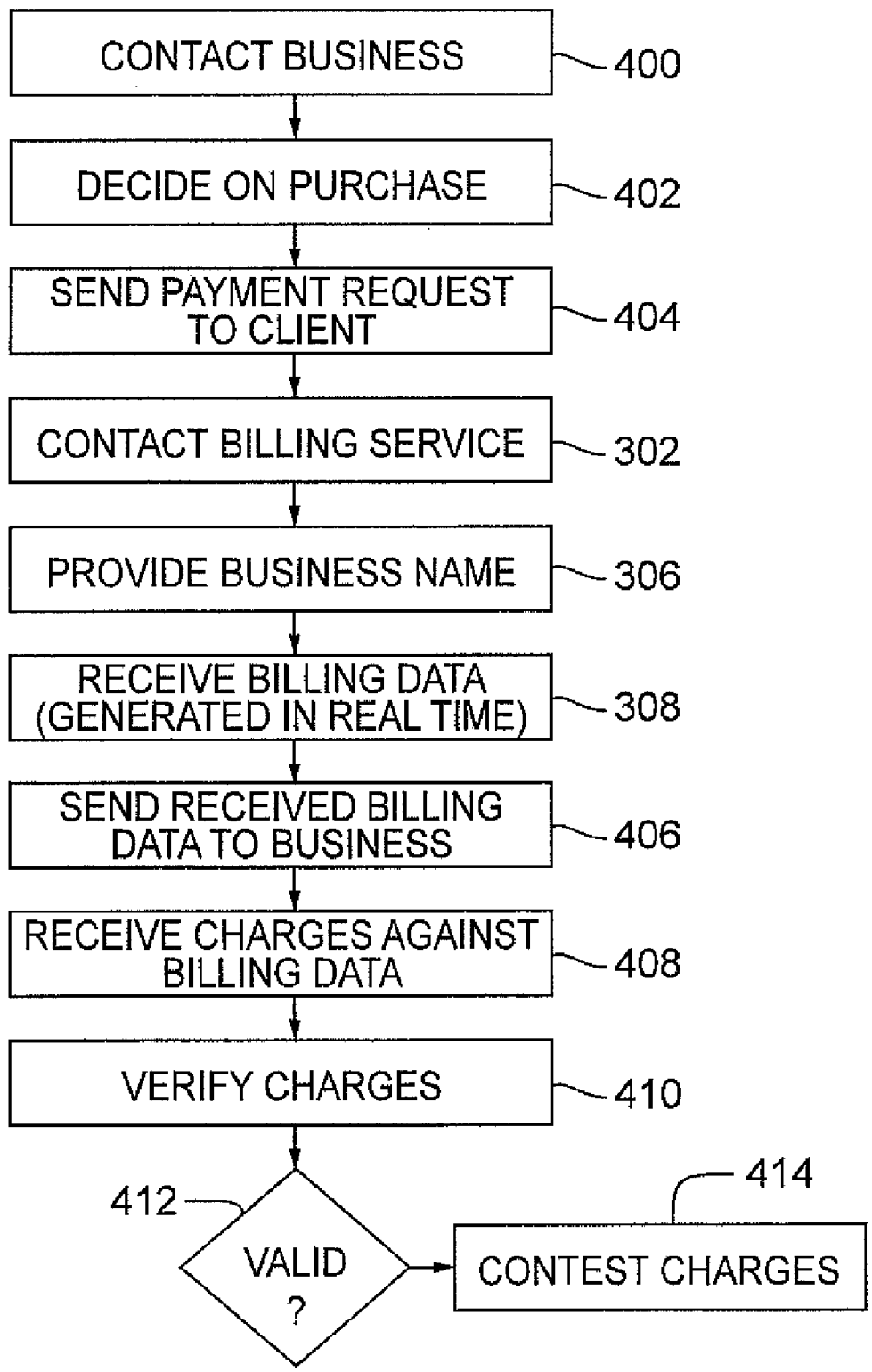
FIG. 4 is a flowchart according to one embodiment of the invention, in which a client purchases a good using billing data provided in real-time by a billing service.

FIG. 4 is a flowchart according to one embodiment of the invention, in which a client 100 purchases a good using billing data provided in real-time by a billing service 106. It will be appreciated that even though FIGS. 3 and 4 are presented separately, a single client may use both real-time generated billing data, and advance-obtained billing data, depending on the business.

After contacting 400 a business 102 from which a purchase is to be made, the client 100 user decides 402 on the purchase; this decision is transmitted to the business. It will be appreciated that this decision-making process may include the user reviewing various offerings of the business 102 (e.g., "surfing" the business web site), as well as directly connecting to a particular uniform resource location (URL) for purchasing a product (a purchase link may be known in advance).

In response to the purchase decision, the business 102 sends 404 a payment request to the client. In response, analogous to that described above for FIG. 3, the client contacts 302 the billing service 106, provides 306 the business name to the service, and receives in real time billing data generated 308 by the billing service for the business 102. In one embodiment, the billing data presented to the client 100 is uniquely associated with the particular business 102 the client 100 is purchasing from.

As with FIG. 3, unbeknownst to the business 102, in response to the payment request 404, instead of sending personal billing information of the user, the real time generated billing data is instead sent 406 to the business.

Charges made against the billing data are received 408 by the billing service. As with FIG. 3, these charges are verified 410 for validity. If 412 the charges appear invalid/fraudulent, the charge may be automatically contested 324 or other action taken, such as highlighting the transaction to the user to allow review of the validity of the charge.

If 412 the charge is valid, then the client is billed for the purchase amount paid by the billing service. Note that the client may be billed in a manner entirely different from the payment system required/used by the business 102. In one embodiment, highlighting occurs within the bill sent to the user to accentuate invalid or possibly invalid charges. Highlighting can be by a variety of different methods, such as printing an offending charge in a bold typeface, in a larger type size, in a different font from the rest of the bill, in a different color, in a different section of a bill which organizes suspect charges in a single region, or through a combination of these or other highlighting techniques.

In one embodiment, the billing service 106 tracks expiration dates for charges made by the user. That is, if a charge is received against a credit card number provided to a client 100 for purchasing from a business 102, there may be a timeout period, such as 60 days, in which a charge must be contested if such charge is to be ever contested. In such circumstances, the highlighting may include prioritization of listed charges according to expiration of contest periods. In another embodiment, a separate bill section is provided for contestable charges expiring within a certain amount of time, such as two weeks.

In one embodiment, the client can elect to be billed electronically, in addition to or in lieu of receiving a physical bill printed on paper. Electronic billing can be by way of E-mailing or otherwise electronically transferring bill data to the client. Alternatively, bills can be maintained by the billing service 106, such as through personalized web pages to which a client can log in and review charges. In one embodiment, the personalize web pages include buttons or other controls to allow disputing charges. In one embodiment, single-click buttons are provided with listed charges, where a single click of the button institutes a dispute process to cause the selected charge to be reviewed for fraud.

Figure 5:
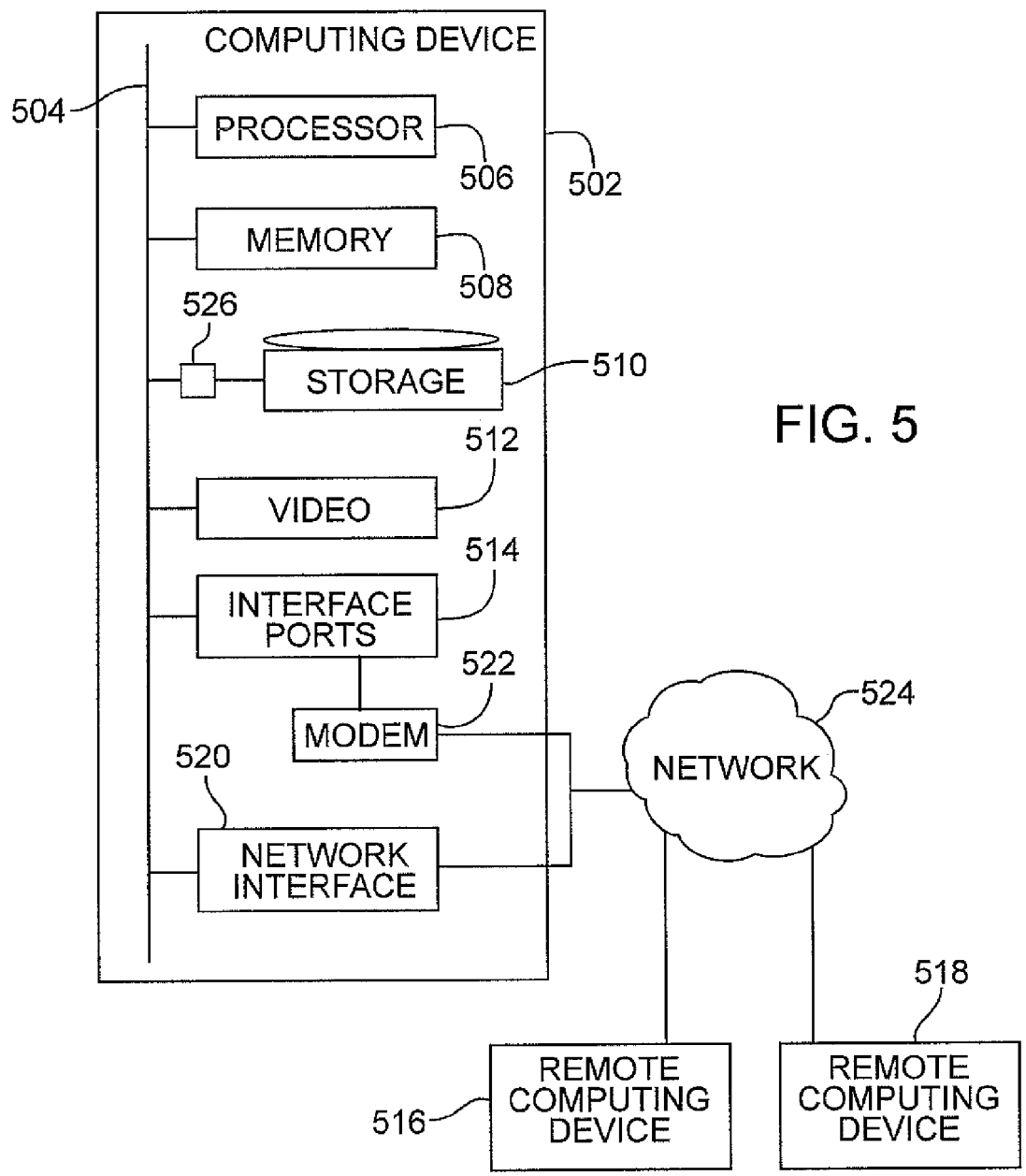
FIG. 5 illustrates one embodiment of a suitable computing environment in which certain aspects of the illustrated invention may be implemented.

FIG. 5 and the following discussion are intended to provide a brief, general description of a suitable computing environment in which certain aspects of the illustrated invention may be implemented. The invention may be described by reference to different high-level program modules and/or low-level hardware contexts. Those skilled in the art will realize that program module references can be interchanged with low-level hardware instructions.

Program modules include procedures, functions, programs, components, data structures, and the like, that perform particular tasks or implement particular abstract data types. The modules may be incorporated into single and multi-processor computing systems, as well as hand-held devices and controllable consumer devices (e.g., Personal Digital Assistants (PDAs), cellular telephones, set-top boxes, Internet appliances, etc.). It is understood that modules may be implemented on a single computing device, or processed over a distributed network environment, where modules can be located in both local and remote memory storage devices.

An exemplary system for implementing the invention includes a computing device 502 having system bus 504 for coupling together various components within the computing device. The system 504 bus may be any of several types of bus structures, such as PCI, AGP, VESA, Microchannel, ISA and EISA, etc. Typically, attached to the bus 504 are processors 506 such as Intel, DEC Alpha, PowerPC, programmable gate arrays, etc., a memory 508 (e.g., RAM, ROM), storage devices 510, a video interface 512, and input/output interface ports 514.

The storage systems and associated computer-readable media provide storage of data and executable instructions for the computing device 502. Storage options include hard-drives, floppy-disks, optical storage, magnetic cassettes, tapes, flash memory cards, memory sticks, digital video disks, and the like, and may be connected to the bus 504 by way of an interface 526.

Computing device 502 is expected to operate in a networked environment using logical connections to one or more remote computing devices 516, 518 through a network interface 520, modem 522, or other communication pathway. Computing devices may be interconnected by way of a network 524 such as a local intranet or the Internet. Thus, for example, with respect to the illustrated embodiments, assuming computing device 502 is a client seeking to purchase goods, then remote devices 516, 518 may be a billing service 516 providing substitute billing data to the user for purchasing goods from a business 518.

It will be appreciated that remote computing devices 516, 518 may be configured like computing device 502, and therefore include many or all of the elements discussed for computing device 502. It should also be appreciated that computing devices 502, 516, 518 may be embodied within a single device, or separate communicatively-coupled components, and include routers, bridges, peer devices, web servers, and application programs utilizing network application protocols such as HTTP, File Transfer Protocol (FTP), Gopher, Wide Area Information Server (WAIS), and the like.

Having described and illustrated the principles of the invention with reference to illustrated embodiments, it will be recognized that the illustrated embodiments can be modified in arrangement and detail without departing from such principles.

And, even though the foregoing discussion has focused on particular embodiments, it is understood that other configurations are contemplated. In particular, even though expressions such as "in one embodiment," "in another embodiment," and the like are used herein, these phrases are meant to generally reference embodiment possibilities, and are not intended to limit the invention to particular embodiment configurations.

As used herein, these terms may reference the same or different embodiments, and unless expressly indicated otherwise, are combinable into other embodiments. Consequently, in view of the wide variety of permutations to the above-described embodiments, the detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A computing device implemented method comprising:
   operating with one or more computing devices a billing service independent of one or more billing data issuing sources;
   obtaining by the one or more computing devices of the billing service a first and a second billing data from said one or more billing data issuing sources, the first and second billing data being separate and distinct billing data;
   providing by the one or more computing devices of the billing service the first billing data to a client, in response to a request received by the billing service for the first billing data, for use by a user to conduct transactions with a first web site, said first billing data being associated with the first web site by said billing service or said first billing data having been associated with the first web site by the user and said billing service receiving notification of such association, said billing service receiving notification of usage of the first billing data after the first billing data has been used to conduct a transaction, said notification of usage of the first billing data including identification of a first entity with which the first billing data was used and facilitating verification by said billing service of validity of the usage of the first billing data;
   determining by the one or more computing devices of the billing service whether use of the first billing data is valid, including determining whether the first billing data was used with the first web site by comparing identity of the first entity against identity of the first web site;

providing by the one or more computing devices of the billing service the second billing data to the client, in response to a request received by the billing service for the second billing data, for use by said user to conduct transactions with a second web site, said second billing data being associated with the second web site by said billing service or said second billing data having been associated with the second web site by the user and said billing service receiving notification of such association, said billing service receiving notification of usage of the second billing data after the second billing data has been used to conduct a transaction, said notification of usage of the second billing data including identification of a second entity with which the second billing data was used and facilitating verification by said billing service of validity of the usage of the second billing data; and determining by the one or more computing devices of the billing service whether use of the second billing data is valid, including determining whether the second billing data was used with the second web site by comparing identity of the second entity against identity of the second web site.

2. The method of claim 1, wherein the billing service providing the first billing data to the client comprises providing said first billing data to the client in advance of the user registering with said first web site.

3. The method of claim 1, wherein the billing service providing the first billing data to the client comprises providing said first billing data to the client in real time while the user is registering with said first web site.

4. The method of claim 1, wherein the first billing data comprises a first credit card identifier, and the second billing data comprises a second credit card identifier, separate and distinct from said first credit card identifier.

5. The method of claim 1, further comprising the billing service billing the user according to a billing arrangement different from a billing arrangement corresponding to a payment format required by the first web site.

6. The method of claim 1, further comprising the billing service determining a billing format for the user, and converting, on behalf of the user, between a billing format corresponding to a payment format required by the first web site and said determined billing format.

7. The method of claim 1, further comprising the billing service receiving a charge against said first billing data for a purchase of a product by the user from the first web site using said first billing data, and billing the user.

8. The method of claim 1, wherein
the billing service obtaining comprises the billing service obtaining said first billing data from a financial institution that is a billing data issuing source.

9. The method of claim 1, wherein
the billing service obtaining comprises the billing service obtaining at least a selected one of said first and second billing data in real time, just prior to providing the selected one of the first and second billing data to the client or the corresponding one of the first and second web sites.

10. The method of claim 1, wherein
the billing service obtaining comprises the billing service pre-obtaining said first billing data; and
the billing service providing said first billing data to either the client or the first web site, in real time, during a first transaction with the first web site.

11. The method of claim 10, wherein the billing service obtaining comprises:

the billing service obtaining a plurality of billing data from a bank that is a billing data issuing source; and
the billing service selecting said first and second billing data from said obtained plurality of billing data.

12. The method of claim 1, wherein said receiving of notification of usage of said first billing data with said first web site by the billing service occurs substantially with providing of said first billing data to said first web site.

13. The method of claim 1, wherein said receiving of notification of usage of said first billing data with the first web site by the billing service occurs after providing of said first billing data to said first web site.

14. The method of claim 1, further comprising:
the billing service organizing said received notifications of usage of said first and second billing data, based at least in part on whether the usages are with the first and the second web sites, respectively.

15. The method of claim 14, further comprising:
the billing service disputing all notifications of usage of said first and second billing data not associated with the first and second web sites respectively.

16. The method of claim 15, wherein the billing service performing said disputing comprises the billing service performing said disputing in response to an instruction of the user.

17. The method of claim 16, further comprising:
the billing service providing a user interface having a control for instructing disputing of all usages of said first and second billing data not associated with said first and second web sites respectively.

18. The method of claim 1, wherein the first web site is a selected one of a content provider, a service provider, and an access provider.

19. The method of claim 1, wherein said facilitating verification by said billing service of validity of the usage of the first billing data comprises facilitating verification of validity of a charge resulting from said usage of the first billing data.

20. The method of claim 1, wherein said facilitating verification by said billing service of validity of the usage of the second billing data comprises facilitating verification of validity of a charge resulting from said usage of the second billing data.

21. The method of claim 1, wherein the billing service providing the first billing data to the client to conduct transactions with the first web site comprises providing said first billing data to the client for exclusive use with said first web site.

22. The method of claim 1, wherein the billing service providing the second billing data to the client to conduct transactions with the second web site comprises providing said second billing data to the client for exclusive use with said second web site.

23. An apparatus comprising:
a storage medium having stored therein a plurality of programming instructions designed to enable the apparatus to operate or contribute in operating a billing service when the programming instructions are executed, the billing service being configured to,
obtain a first and a second billing data from one or more billing data issuing sources, and operate independent of said one or more billing data issuing sources, the first and second billing data being separate and distinct data,
provide the first billing data to a client, in response to a request received by the billing service for the first billing data, as substitute for personal billing data of a user, for transactions conducted with a first web site, said first billing data being associated with the first web site by said billing service or said first billing data having been associated with the first web site by the user and said billing service receiving notification of such association, receive notification of usage of the first billing data after the first billing data has been used to conduct a transaction, said notification of usage of the first billing data including identification of a first entity with which the first billing data was used and facilitating verification by said billing service of validity of the usage of the first billing data, determine whether use of the first billing data is valid, including to determine whether the first billing data was used with the first web site by comparing identity of the first entity against identity of the first web site, provide the second billing data to the client, in response to a request received by the billing service for the second billing data, as substitute for personal billing data of the user, for transactions conducted with a second web site, said second billing data being associated with the second web site by said billing service or said second billing data having been associated with the second web site by the user and said billing service receiving notification of such association, receive notification of usage of the second billing data after the second billing data has been used to conduct a transaction, said notification of usage of the second billing data including identification of a second entity with which the second billing data was used and facilitating verification by said billing service of validity of the usage of the second billing data, determine whether use of the second billing data is valid, including to determine whether the second billing data was used with the second web site by comparing identity of the second entity against identity of the second web site, and a processor coupled to the storage medium to execute the plurality of programming instructions.

24. The apparatus of claim 23, wherein the programming instructions, when executed by said processor, enable the apparatus to:

provide the first billing data to the client for registering with said first web site.

25. The apparatus of claim 23, wherein the programming instructions, when executed by said processor, enable the apparatus to:

provide the first billing data to said first web site during registration therewith.

26. The apparatus of claim 23, wherein the programming instructions, when executed by said processor, enable the apparatus to:

determine a private billing format for the user; and convert, on behalf of the user, between a billing format corresponding to said first billing data and said determined private billing format.

27. The apparatus of claim 23, wherein the programming instructions, when executed by the processor, further enable the apparatus to:

receive a third plurality of billing data from the one or more billing data issuing sources;

provide the first and second billing data, and the third plurality of billing data to an electronic device used by the user;

facilitate the user in selecting to use said first billing data from said provided billing data for exclusive use with said first web site; and facilitate the user in selecting to use said second billing data from said provided billing data for exclusive use with said second web site.

28. The apparatus of claim 23, further comprising:

a network interface;

wherein the programming instructions, when executed by the processor, further configure the network interface to connect to a network, to couple the apparatus to the one or more billing data issuing sources, and to an electronic device used by the user.

29. The apparatus of claim 23, wherein the programming instructions, when executed by the processor, enable the apparatus to provide in real time said first billing data to an electronic device used by the user, while the user is registering with said first web site.

30. The apparatus of claim 23, wherein said facilitating verification by said billing service of validity of the usage of the first billing data comprises facilitating verification of validity of a charge resulting from said usage of the first billing data.

31. The apparatus of claim 23, wherein said facilitating verification by said billing service of validity of the usage of the second billing data comprises facilitating verification of validity of a charge resulting from said usage of the second billing data.

32. A machine-accessible medium having associated instructions that, when accessed, results in a machine:

obtaining a first and a second billing data from one or more billing data issuing sources, and operating independent of said one or more billing data issuing sources, the first and second billing data being separate and distinct data;

providing the first billing data to a client, in response to a request received by the billing service for the first billing data, to substitute for personal billing data of a user, for transactions conducted with a first web site, said first billing data being associated with the first web site by said billing service or said first billing data having been associated with the first web site by the user and said billing service receiving notification of such association;

receiving notification of usage of the first billing data after the first billing data has been used to conduct a transaction, said notification of usage of the first billing data including identification of a first entity with which the first billing data was used and facilitating verification by said billing service of validity of the usage of the first billing data;

determining whether use of the first billing data is valid, including determining whether the first billing data was used with the first web site by comparing identity of the first entity against identity of the first web site;

providing the second billing data to the client, in response to a request received by the billing service for the second billing data, to substitute for personal billing data of the user, for transactions conducted with a second web site, said second billing data being associated with the second web site by said billing service or said second billing data having been associated with the second web site by the user and said billing service receiving notification of such association;

receiving notification of usage of the second billing data after the second billing has been used to conduct a transaction, said notification of usage of the second billing data including identification of a second entity with which the second billing data was used and facilitating verification by said billing service of validity of the usage of the second billing data; and determining whether use of the second billing data is valid, including determining whether the second billing data was used with the second web site by comparing identity of the second entity against identity of the second web site.

33. The medium of claim 32, wherein the associated instructions, when accessed, resulting in the billing service providing the first billing data to the client comprises the associated instructions, when accessed, resulting in the billing service providing said first billing data to the client in advance of the user registering with said first web site.

34. The medium of claim 32, wherein the associated instructions, when accessed, resulting in the billing service providing the first billing data to the client comprises the associated instructions, when accessed, resulting in the billing service providing said first billing data to the client in real time while the user is registering with said first web site.

35. The medium of claim 32, wherein the associated instructions, when accessed, resulting in facilitating verification by said billing service of validity of the usage of the first billing data comprises the associated instructions, when accessed, resulting in facilitating verification of validity of a charge resulting from said usage of the first billing data.

36. The medium of claim 32, wherein the associated instructions, when accessed, resulting in facilitating verification by said billing service of validity of the usage of the second billing data comprises the associated instructions, when accessed, resulting in facilitating verification of validity of a charge resulting from said usage of the second billing data.

37. A device comprising:
means for obtaining a first and a second billing data from one or more billing data issuing sources, the first and second billing data being separate and distinct billing data;
means for providing the first billing data to a client, in response to a request received by a billing service for the first billing data, for use by a user to conduct transactions with a first web site, said first billing data being associated with the first web site by said billing service or said first billing data having been associated with the first web site by the user and said billing service receiving notification of such association, said billing service receiving notification of usage of the first billing data after the first billing data has been used to conduct a transaction, said notification of usage of the first billing data including identification of a first entity with which the first billing data was used and facilitating verification by said billing service of validity of the usage of the first billing data;
means for determining whether use of the first billing data is valid, including determining whether the first billing data was used with the first web site by comparing identity of the first entity against identity of the first web site;
means for providing the second billing data to said client, in response to a request received by the billing service for the second billing data, for use by said user to conduct transactions with a second web site, said second billing data being associated with the second web site by said billing service or said second billing data having been associated with the second web site by the user and said billing service receiving notification of such association, said billing service receiving notification of usage of the second billing data after the second billing data has been used to conduct a transaction, said notification of usage of the second billing data including identification of a second entity with which the second billing data was used and facilitating verification by said billing service of validity of the usage of the second billing data; and
means for determining whether use of the second billing data is valid, including determining whether the second billing data was used with the second web site by comparing identity of the second entity against identity of the second web site.

38. A computing device implemented method comprising:
operating with one or more computing devices a billing service independent of one or more billing data issuing sources;
obtaining by the one or more computing devices of the billing service at least a first billing data from said one or more billing data issuing sources;
providing by the one or more computing devices of the billing service the first billing data to a client, in response to a request received by the billing service for the first billing data, for use by said user to conduct transactions with a first web site, said first billing data associated with the first web site by said billing service or said first billing data associated with the first web site by the user and said billing service receiving notification of such association, said billing service receiving notification of usage of the first billing data after the first billing data has been used to conduct a transaction, said notification of usage of the first billing data including identification of a first entity with which the first billing data was used and facilitating verification by said billing service of validity of the usage of the first billing data; and
determining by the one or more computing devices of the billing service whether use of the first billing data is valid, including determining whether the first billing data was used with the first web site by comparing identity of the first entity against identity of the first web site.

39. The method of claim 38, further comprising
obtaining a second billing data;
providing the second billing data to the client for use by said user to conduct transactions with a second web site, said second billing data associated with the second web site by said billing service or said second billing data associated with the second web site by the user and said billing service receiving notification of such association, said billing service receiving notification of usage of the second billing data after the second billing data has been used to conduct a transaction, said notification of usage of the second billing data including identification of a second entity with which the second billing data was used and facilitating verification by said billing service of validity of the usage of the second billing data; and
determining whether use of the second billing data is valid, including determining whether the second billing data was used with the second web site by comparing identity of the second entity against identity of the second web site.

40. A method comprising:
requesting a billing service for billing data, the billing service operating independent of a billing data issuing source from which the billing data has been issued, and the billing service having received the billing data from the billing data issuing source;
receiving the billing data from the billing service to conduct transactions with a web site, the billing data associated with the web site by the billing service, or associating the billing data with the web site and notifying the billing service of such association, and using the billing data to conduct a transaction with the web site causing notification of usage to be transmitted to the billing service including identification of an entity with which the first billing data was used and to facilitate verification of usage of the billing data, including a determination whether the first billing data was used with the first web site by comparing identity of the entity against identity of the first web site.

41. The method of claim 40, wherein requesting a billing service for billing data comprises requesting a billing service for billing data prior to registering with the first web site.

42. The method of claim 40, wherein requesting a billing service for billing data comprises requesting a billing service for billing data in real time while registering with said first web site.

43. A computing device implemented method of a billing service, the method comprising:

receiving by one or more computing devices a request for billing data;

receiving by the one or more computing devices, before or after the request, the billing data from a billing data issuing source, the one or more computing devices associated with a billing service operating independent of the billing data issuing source;

providing by the one or more computing devices the billing data in response to the request, the billing data associated with a web site by the billing service or the billing data associated with the web site by a user and the billing service receiving notification of such association, the billing service receiving notification of usage of the billing data after the billing data has been used to conduct a transaction, the notification of usage of the billing data including identification of an entity with which the billing data was used and facilitating verification by the billing service of validity of the usage of the billing data; and determining by the one or more computing devices whether use of the billing data is valid, including determining whether the billing data was used with the web site by comparing identity of the entity against identity of the web site.

44. The method of claim 43, further comprising receiving an additional request for additional billing data;

receiving by the one or more computing devices, before or after the additional request, the additional billing data from a billing data issuing source, the one or more computing devices associated with the billing service operating independent of the billing data issuing source;

providing by the one or more computing devices the additional billing data in response to the additional request, the additional billing data associated with an additional web site by the billing service or the additional billing data associated with the additional web site by a user and the billing service receiving notification of such association, the billing service receiving notification of usage of the additional billing data after the additional billing data has been used to conduct a transaction, the notification of usage of the additional billing data including identification of another entity with which the additional billing data was used and facilitating verification by the billing service of validity of the usage of the additional billing data; and determining by the one or more computing devices whether use of the additional billing data is valid, including determining whether the additional billing data was used with the additional web site by comparing identity of the another entity against identity of the additional web site.

\* \* \* \* \*